United States Patent [19]
Shono

[11] Patent Number: 6,031,998
[45] Date of Patent: Feb. 29, 2000

[54] DIGITAL CAMERA

[75] Inventor: Tetsuji Shono, Saitama, Japan

[73] Assignee: Asahi Kogaku Kogyo Kabushiki Kaisha, Tokyo, Japan

[21] Appl. No.: 09/161,235

[22] Filed: Sep. 28, 1998

[30] Foreign Application Priority Data

Oct. 1, 1997 [JP] Japan ................................ 9-268793

[51] Int. Cl.[7] .......................... G03B 7/099; G03B 17/04
[52] U.S. Cl. ............................. 396/75; 396/85; 396/270; 396/349; 348/340; 348/358; 348/374
[58] Field of Search ................................ 396/73, 74, 75, 396/85, 72, 349, 268, 270; 348/340, 358, 374, 373, 375, 376; 358/909.1

[56] References Cited

U.S. PATENT DOCUMENTS

| | | | |
|---|---|---|---|
| 5,444,485 | 8/1995 | Uchioke et al. | 348/340 X |
| 5,627,589 | 5/1997 | Ejima et al. | 348/340 |
| 5,673,083 | 9/1997 | Izumi et al. | 348/340 |
| 5,731,834 | 3/1998 | Huot et al. | 348/374 |
| 5,765,060 | 6/1998 | Shimizu | 396/268 |

*Primary Examiner*—W. B. Perkey
*Attorney, Agent, or Firm*—Greenblum & Bernstein, P.L.C.

[57] ABSTRACT

A digital still camera having an image pickup device which picks up an image formed by a photographing lens includes a photographing lens provided with at least two lens groups of which the rearmost lens group does not move in the optical axis direction and a sealing member which seals a photographing light path defined between the rearmost lens group and the image pickup device.

13 Claims, 4 Drawing Sheets

| S | W | T |
|---|---|---|
| ACCOMMODATION SECTION | | ZOOMING SECTION |

ZOOMING SECTION    ACCOMMODATION SECTION

DIGITAL CAMERA

BACKGROUND OF THE INVENTION

1. Field of the Invention

The present invention relates to a digital camera.

2. Description of the Related Art

In recent years, digital cameras in which an object image to be recorded is converted to electrical signals have been developed. In a digital (still) camera, an object image formed by a photographing lens is converted to electrical analog signals by an image pickup device, such as a CCD. The analog signals are converted to digital signals which are recorded in a memory means such as a compact flash memory card or a smart medium at a predetermined format, or a recording medium such as a magnetic disc or a photomagnetic disc, etc.

The size of an image pickup surface (light receiving surface) of a CCD image pickup device is approximately in the range of ¼ to ½ inches (diagonally) and is smaller than a size of 35 mm silver-halide film. The light receiving surface is provided thereon with hundreds of thousands of pixels, the size thereof being a few micron meters ($\mu$m) each side. Therefore, if there is fine dust in front of the CCD image pickup device, the shadow (image) thereof is enlarged and projected onto the light receiving surface. Consequently, the image (shadow) of the dust is projected onto a number of pixels on the light receiving surface, so that the enlarged shadow is imaged thereon. To prevent this, a light path in front of the CCD image pickup device must be constructed so as to prevent foreign matter such as dust from sticking thereto.

If the light path in front of the CCD image pickup device is made airtight, the thickness of the CCD image pickup device and the sealing construction is increased, and hence the accommodation space (i.e., the length in the optical axis direction) of the camera body in which the photographing lens is retracted and accommodated when it is not used is too small (too short) to receive the entirety of the photographing lens in the accommodation space, thus resulting in difficulty in providing a thin camera body.

SUMMARY OF THE INVENTION

The object of the present invention is to provide, via a simple structure, a digital still camera which prevents foreign matter from sticking to the front of the CCD image pickup device and from being imaged thereon; and wherein the length of the photographing lens in a retracted position can be reduced.

To achieve the object mentioned above, according to an aspect of the present invention, there is provided a digital camera having an image pickup device which picks up an image formed by a photographing lens which includes: a photographing lens constituting at least two lens groups of which the rearmost lens group does not move in the optical axis direction; and a sealing member which seals a light path defined between the rearmost lens group and the image pickup device.

The photographing lens is a zoom lens and wherein the rearmost lens group does not move in the optical axis direction during the zooming operation or focusing operation of the zoom lens.

Preferably, the sealing member is made of a cylindrical member which forms an image pickup unit in which the rearmost lens group and the image pickup device are made integral with each other.

According to another aspect of the present invention, there is provided a digital camera having an image pickup device which picks up an image formed by a photographing lens which includes: a photographing lens constituting at least two lens groups of which the rearmost lens group does not move in the optical axis direction; a cylindrical sealing member which forms an image pickup unit in which the rearmost lens group and the image pickup device are made integral with each other and which seals a light path defined between the rearmost lens group and the image pickup device; and an image pickup unit moving device which supports the image pickup unit to move into or out of the photographing light path.

The photographing lens is a zoom lens and wherein the rearmost lens group does not move in the optical axis direction during the zooming operation or focusing operation of the zoom lens.

Preferably, the digital camera further includes a lens driving device which moves the remaining lens group of the photographing lens into the portion of the photographing light path from which the image pickup unit has been retracted.

Preferably, the photographing lens includes first and second lens groups which are moved away from or close to each other along the optical axis, so that upon picking up an image, the first and second lens groups are moved forward and thereafter the image pickup unit moving device moves the image pickup unit into the photographing light path, and upon retraction, the image pickup unit moving device retracts the image pickup unit from the photographing light path and thereafter the second lens group is moved into the portion of the photographing light path from which the image pickup unit has been retracted.

Preferably, the image pickup unit is provided with a support plate which is pivoted on the camera body to rotate about a shaft which extends in parallel with the optical axis of the zoom lens, the image pickup unit being secured to the support plate so that the image pickup unit can be moved into or out of the photographing light path in accordance with the rotation of the support plate.

Preferably, the zoom lens is provided with a lens barrel which moves the first and second lens groups between a photographable position and a storage position, and a linkage which is adapted to move the image pickup unit into or out of the photographing light path through the support plate in association with the movement of the first and second lens groups.

Preferably, the zoom lens is a power zoom lens and is provided with a cam plate which is moved in a direction perpendicular to the optical axis of the power zoom lens in association with the zooming operation of the power zoom lens, and a linkage which moves the support plate in association with the movement of the cam plate when the power zoom lens is moved between the photographable position and the storage position and moves the image pickup unit into or out of the photographing light path.

The present disclosure relates to subject matter contained in Japanese Patent Application No.9-268793 (filed on Oct. 1, 1997) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENT

Figure 1:
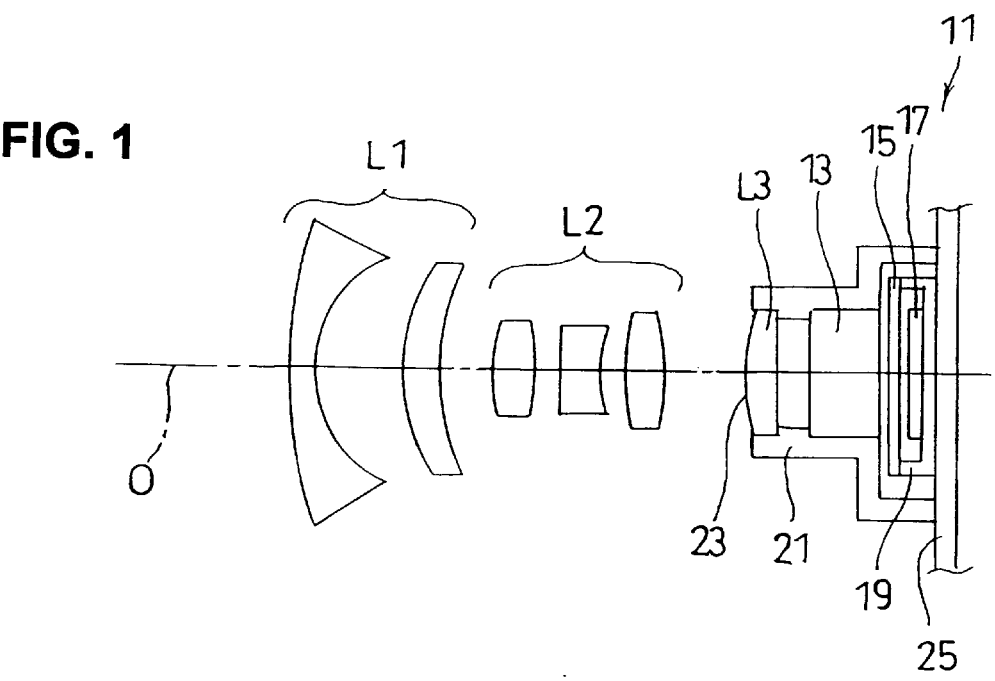
FIG. 1 is a sectional view of a digital still camera having an apparatus for preventing foreign matter from sticking to the front of a CCD image pickup device and from being imaged thereon, according to the present invention.

FIG. 1 shows a sectional view of an optical system and a photographing system of a digital still camera having a zoom lens, to which the present invention is applied.

A zoom lens includes a photographing optical system composed of a first lens group L1, a second lens group L2, and a third lens group (rearmost lens group) L3. The first and second lens groups L1 and L2 are relatively moved along the optical axis O away from or close to each other to carry out the zooming operation or focusing operation. The third lens group does not move during the zooming or focusing operation. An object image formed by the zoom lens is projected onto a light receiving surface of a CCD image pickup device (image pickup means) 17.

On the object side of the CCD image pickup device 17 there is a filter (low-pass filter and an infrared ray cut filter) 13, and a glass cover 15 in this order from the object side. The filter 13, the glass cover 15 and the CCD image pickup device 15 are integrally connected to a frame 19. The frame 19 is secured to a substrate 25.

The frame 19 is covered by a cylindrical sealing member 21 in which the filter 13, the glass cover 15 and the CCD image pickup device 17 are housed. The third lens group L3 is secured to the front end of the sealing member 21. The sealing member 21 integrally connects the third lens group L3 and the CCD image pickup device 17, etc., and makes an airtight seal around the light path defined therebetween. Consequently, foreign matter such as dust cannot enter the cylindrical sealing member 21 and hence, no foreign matter sticks to the surface of the filter 13. Thus, no foreign matter can be imaged thereon. Even if dust or the like does stick to the front surface 23 of the third lens group L3, since the light receiving surface of the CCD image pickup device 17 is spaced from the front surface 23 of the third lens group L3, the shadow of the dust (or the like) is reduced in size and projected onto the light receiving surface of the CCD image pickup device 17. Therefore, virtually no or little dust is imaged thereon.

The cylindrical sealing member 21 is also secured to the substrate 25 and constitutes a CCD image pickup unit 11, together with the substrate 25, the third lens group L3 and the CCD image pickup device 17. The electrical image signals produced by the CCD image pickup unit 11 are supplied to an image processing circuit through a cable (not shown); are converted to a predetermined format of digital data by the image processing circuit; and are recorded in a recording medium such as a memory card or are output to an external device.

The above discussion has been addressed to an embodiment of an apparatus for preventing foreign matter from being imaged thereon. The following discussion will be addressed to an embodiment of the present invention applied to a compact digital still camera (FIGS. 2 through 4). In this embodiment, the zoom lens is a three-lens type zoom lens composed of a first lens group L1, a second lens group L2, and a stationary third lens group (rearmost lens group) L3. Namely, the first and second lens groups L1 and L2 are relatively moved toward or away from each other to carry out the zooming operation or focusing operation, but the third lens group L3 does not move during the zooming or focusing operation. An object image formed by the first, second and third lens groups is formed on the light receiving surface of the CCD image pickup device 17. The substrate 25 is supported to move in a direction perpendicular to the optical axis O.

Figure 2A:
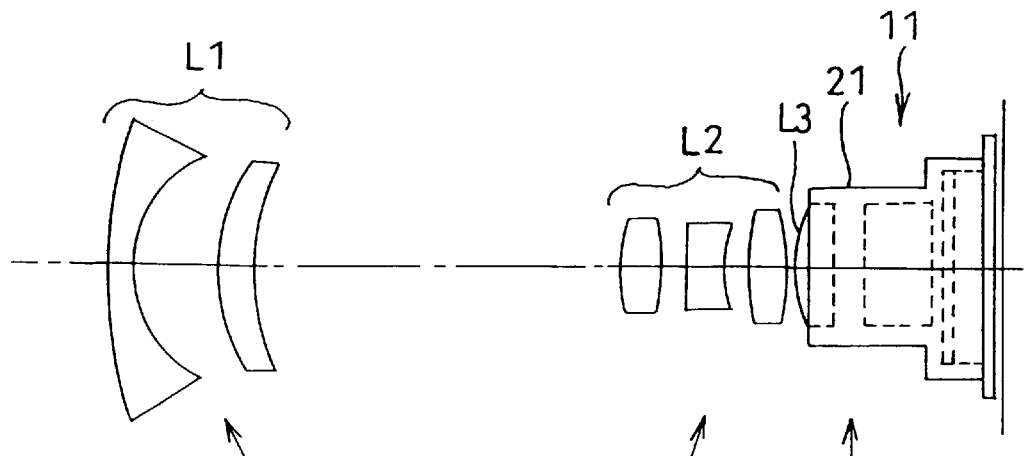
FIG. 2A, 2B and 2C are schematic views of a digital still camera having an apparatus for preventing foreign matter from sticking to the front of a CCD image pickup device and from being imaged thereon, according to the present invention, shown in a telephoto position, a wide angle position, and a storage position, respectively.
Figure 2B:
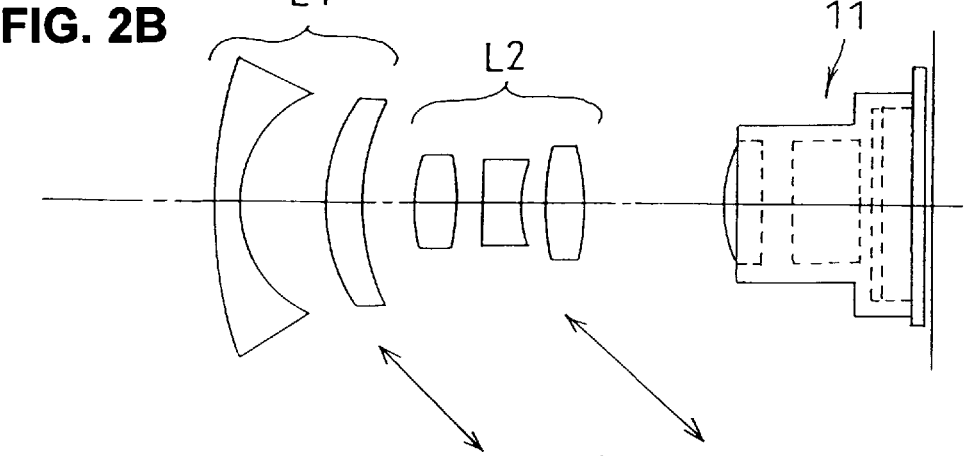
Figure 2C:
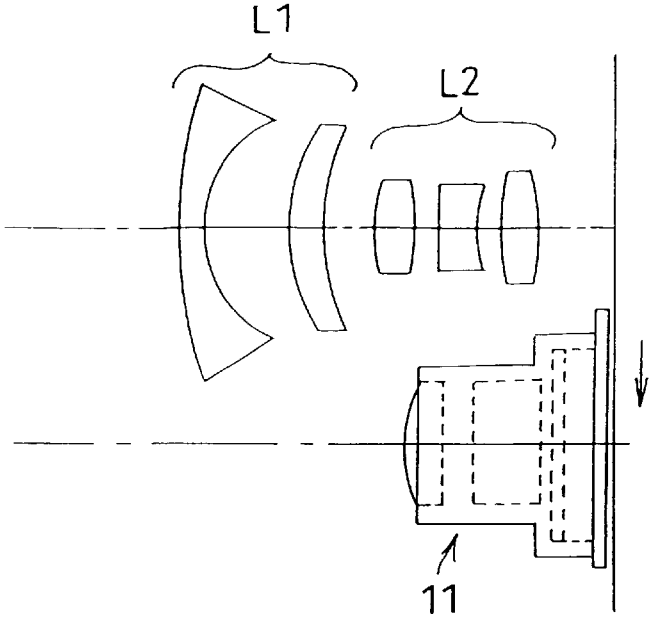

FIGS. 2A, 2B and 2C show a zoom lens in a telephoto position, a wide-angle position and an storage position (retracted position), respectively. The telephoto position, the wide-angle position and intermediate positions between the telephoto position and the wide-angle position are photographable positions in which zooming or focusing can be carried out.

In the telephoto position shown in FIG. 2A, the first lens group L1 is moved forward and the second lens group L2 is moved rearward to the close proximity of the third lens group L3. Upon zooming from the telephoto position toward the wide-angle position, the first lens group L1 is moved rearward, and the second lens group L2 is moved forward, so that the first and second lens groups L1 and L2 are located close to each other. Thus, a wide-angle position is obtained (FIG. 2B). Of course, the first and second lens groups L1 and L2 can be moved in opposite directions between the wide-angle position and the telephoto position. Upon zooming, the third lens group L3 does not move.

Note that the positions of the first and second lens groups L1 and L2 are adjusted by a focusing mechanism so that the image surface (not shown) is identical to the light receiving surface of the CCD image pickup unit 11.

Upon retracting the zoom lens from the photographable position, the CCD image pickup unit 11 is moved in a direction perpendicular to the optical axis O and is retracted from the light path. Consequently, the second lens group L2 is moved in the vacant space in the light path in which the CCD image pickup unit 11 was located, and the first lens group L1 is moved rearward as close as possible to the second lens group L2 (FIG. 2C). This will be referred to as the storage position (retracted position).

As can be understood from the foregoing, in the retracted position of the lens, the CCD image pickup unit 11 including the third lens group L3 is moved in a direction perpendicular to the optical axis and is retracted from the light path and consequently, the second lens group L2 is moved rearward in the vacant space in the light path in which the CCD image pickup unit 11 was located. Therefore, in comparison with the prior art in which the stationary third lens group L3 is located in the photographing light path, the rearward displacement of the first and second lens groups L1 and L2 can be increased. Thus, the overall length of the zoom lens, when retracted, can be reduced and the camera body can be made thin.

FIGS. 3 (3A, 3B) and 4 (4A, 4B) show two different embodiments in which provision is made for a linkage which normally holds the CCD image pickup unit 11 in the photographing light path, and moves the CCD image pickup unit 11 out of or into the photographing light path in association with the movement of the lens.

Figure 3A:
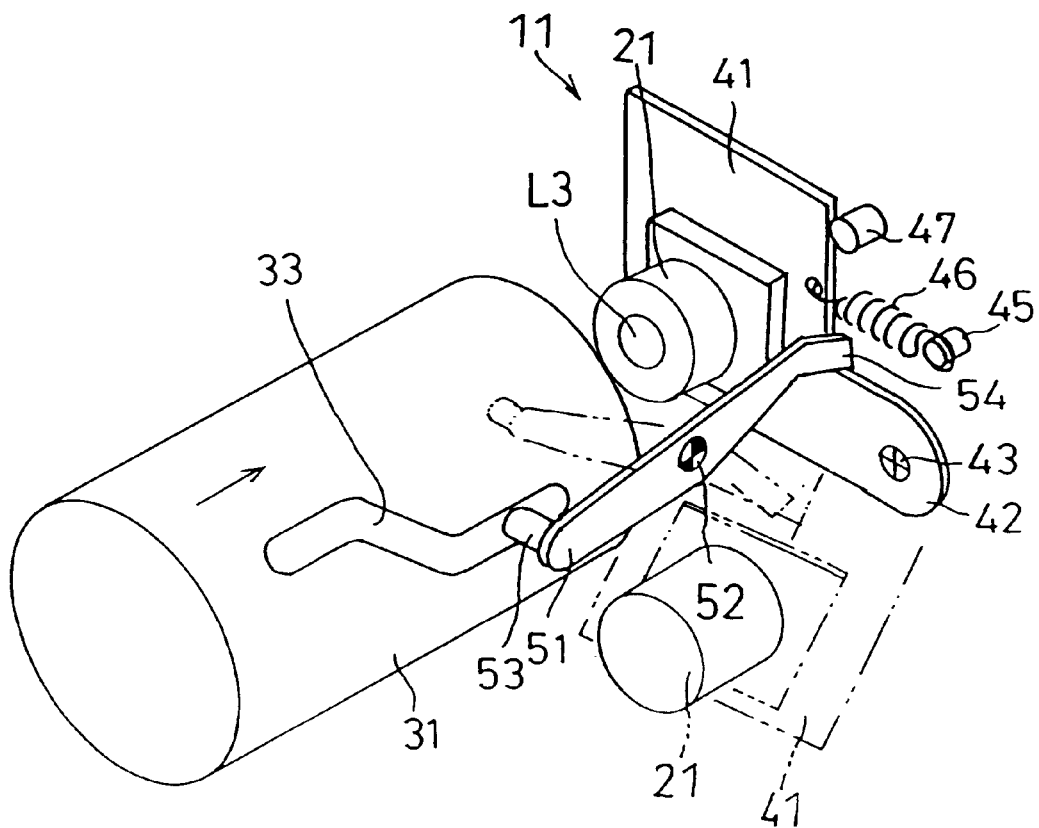
FIG. 3A is a perspective view of a first embodiment of a digital still camera having an apparatus for preventing foreign matter from sticking to the front of a CCD image pickup device and from being imaged thereon, according to the present invention.
Figure 3B:
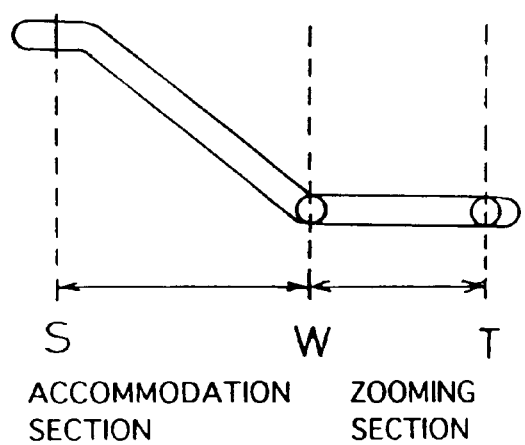
FIG. 3B is a developed view of a cam groove of the cam ring shown in FIG. 3A.

In the first embodiment illustrated in FIGS. 3A and 3B, the CCD image pickup unit 11 is moved between the image pickup position and the retracted position in association with the movement of a linearly movable lens barrel 31. A support plate 41 to which the CCD image pickup unit 11 is mounted is provided with a leg portion 42 which is rotatably supported by a shaft 43 which extends in parallel with the optical axis O of the photographing lens. The shaft 43 is secured to the camera body.

The support plate 41 is biased in a predetermined direction by a tensile spring 46 provided between the support plate 41 and a pin 45 secured to the camera body, so that the support plate 41 abuts against a positioning pin 47 secured to the camera body. This state corresponds to the image pickup position in which an object image is formed on the light receiving surface of the CCD image pickup unit 11 by the zoom lens. The support plate 41 can be rotated against the biasing force of the spring 46 to retract the CCD image pickup unit 11 out of the photographing light path.

There is an association arm 51 outside the lens barrel 31, which extends therealong. The association arm 51 is rotatably supported by a shaft 52 which extends in a direction perpendicular to the optical axis O. The association arm 51 is provided on the front end thereof with a cam pin 53 which is fitted in a cam groove 33 formed in the movable lens barrel 31. The association arm 51 is equipped on the rear end thereof with an association piece 54 which is bent in a direction parallel with the support plate 41 and which abuts against the support plate 41 in a direction in which the support plate 41 can be moved in the retractable direction against the spring force of the spring 46.

The profile of the cam groove 33 formed in the movable lens barrel 31 is such that the association arm 51 is held in the photographing light path and does not swing when within the zooming section W–T in which the movable lens barrel 31 is moved in a photographable state; and the association arm 51 is rotated in the retractable direction within the accommodation section W–S when the movable lens barrel 31 is moved from the wide-angle position W to the storage position S.

Figure 4A:
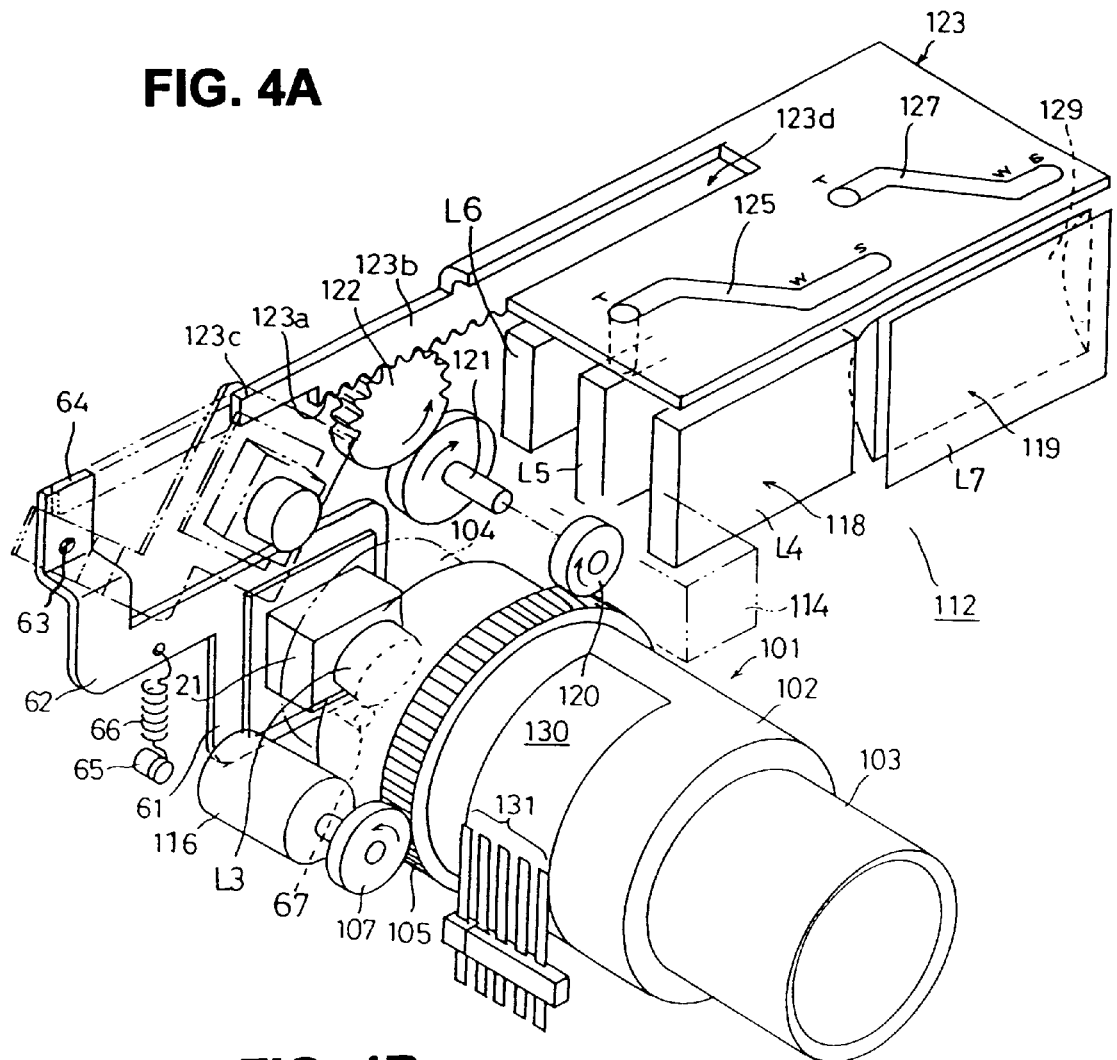
FIG. 4A is a perspective view of a second embodiment of a digital still camera having an apparatus for preventing foreign matter from sticking to the front of a CCD image pickup device and from being imaged thereon, according to the present invention.
Figure 4B:
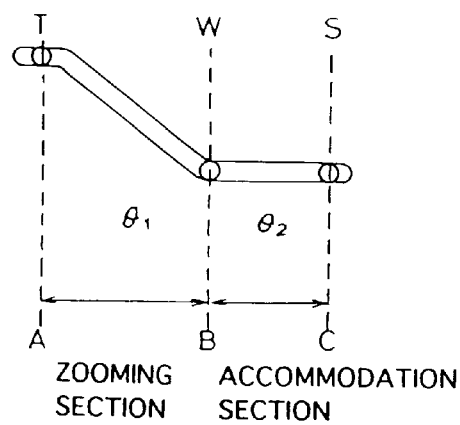
FIG. 4B is an explanatory view of a cam groove of a cam plate shown in FIG. 4A.

FIGS. 4A and 4B show an exploded perspective view of a moving mechanism and a plan view of a cam plate, according to a second embodiment. The zoom lens camera is composed of a lens barrel block 101, a finder/strobe block 112, a light emitter/receiver 114 of an object distance measuring device (AF device), and a motor 116 for zooming and retracting the lens. These elements are secured to an immovable portion (not shown) of the camera body.

The lens barrel block 101 is provided with a cam ring 102, and front and rear lens barrels 103 and 104 which are accommodated in the cam ring 102 and which are axially moved in accordance with the rotation of the cam ring 102. The first lens group L1 and the second lens group L2 are respectively supported by the front lens barrel 103 and the rear lens barrel 104, and are moved between the storage position and the photographable position in association with the rotation of the cam ring 102 by the zoom motor 116; and are also moved within the zoom section.

The finder/strobe block 112 includes a view finder 118 and a strobe device 119. The view finder 118 and the strobe device 119 vary the field of view of the finder and the emission angle of the strobe in association with a change in the focal length of the zoom lens. To this end, the zoom motor 116 is used as a power source of the finder/strobe block 112.

The cam ring 102 is equipped with a sector gear 105 formed on the outer peripheral surface thereof, which is in mesh with a pinion 107 of the zoom motor 116 and a driven pinion 120. The driven pinion 120 is supported by a shaft 121 which extends rearwardly and is provided on its rear end with a reduction gear train 122. The terminal gear of the gear train 122 is in mesh with a rack 123a of the cam plate 123. The cam plate 123 is slidable in the lateral direction perpendicular to the optical axis of the zoom lens. The cam plate 123 is provided on its rear end with a downwardly bent portion 123b which is in turn provided on the rear end (lower end) thereof with the rack 123a, integral therewith. The reduction gear train 122 reduces the rotation speed of the gear 105 and transmits the reduced movement of the cam ring 102 to the cam plate 123. The cam plate 123 is provided with a zooming cam groove 125 for the view finder 118 and a strobe cam groove 127 for the strobe device 119. Note that in FIGS. 4A, 130 and 131 represent a code plate and a conductor brush for detecting the angular position of the cam ring 102, respectively.

The lens system of the view finder 118 essentially constitutes a stationary lens group L4 on the object side, a stationary eyepiece lens group L6 and a movable zoom lens group L5. The zoom lens group L5 is adapted to make the image surface defined by the zooming operation by the lens barrel 101 coincident with the field of view of the view finder 118.

The strobe device 119 is adapted to reduce the emission angle as the focal length of the photographing lens is increased; i.e., as the front lens group is advanced, the emission angle is increased upon close-up photographing to thereby reduce the quantity of light for the object. In the illustrated embodiment, the Fresnel lens is stationary and a reflector (shade) which holds a xenon lamp is moved in the optical axis direction.

The cam plate 123 is laterally moved in association with the rotation of the cam ring 102. The cam plate 123 is moved to a position closest to the lens barrel 101 in a storage position of the lens shown in FIG. 4A and is moved away from the lens barrel 101 in the zoom section, i.e., in the photographable position. In the illustrated embodiment, the CCD image pickup unit 11 can be moved between the photographable position and the retracted position in accordance with the movement between the storage position and the photographable position of the cam plate 123.

The zooming cam groove 125 and the strobe cam groove 127 of the cam plate 123 correspond to the angular positions of the cam ring 102; i.e., the telephoto position "A", the wide-angle position "B", the storage position "C", an angular position θ1 between the telephoto position "A" and the wide-angle position "B", and an angular position θ2 between the wide-angle position "B" and the storage position "C". Namely, the cam grooves 125 and 127 are formed so that the telephoto position is T, the wide-angle position is W, and the storage position is S. In the section between T and W, the magnification of the finder 113 and the emission angle of the strobe device 119 can be varied, and in the accommodation section between W and S, the CCD image pickup unit 11 is moved between the photographable position and the retracted position (see FIG. 3B). The section between the telephoto position T and the wide-angle position W, the cam groove is inclined so as to vary the magnification of the finder 118 and the emission angle of the strobe device 119 in accordance with the focal length of the zoom lens. In the section between the wide-angle position W and the storage position S, the cam groove linearly extends in the direction of the movement of the cam plate 123. Namely, neither the magnification of the finder nor the emission angle of the strobe device change in the section W–S.

The CCD image pickup unit 11 is supported by the support plate 61. The support plate 61 is provided with a generally L-shaped leg portion 62 integral therewith, which is bent rearward at the front end of the bent portion of "L" and is bent again in the direction perpendicular to the optical axis O to define a crank portion. The support plate 61 is pivoted at the crank portion by a shaft 63 secured to the camera body (not shown) and extending in parallel with the optical axis O of the photographing lens.

The support plate 61 is biased in one direction by a tensile spring 66 provided between the support plate and a pin 65 secured to the camera body so that the support plate 61 abuts against a positioning pin 67 secured to the camera body due to the spring force. This state corresponds to the image pickup position in which an object image is formed on the light receiving surface of the CCD image pickup unit 11 by the zoom lens. The support plate 61 can be rotated against the biasing force of the spring 66 to retract the CCD image pickup unit 11 out of the photographing light path.

The front end 64 of the leg portion 62 is opposed to a projecting end 123c which is an extension of the rack 123a. When the zoom motor 116 is rotated toward the storage position to move the cam plate 123 to the storage position, the tip of the projecting end 123c abuts against the front end 64 of the leg portion 62. Consequently, the leg portion 62 is moved in the retraction direction and hence the support plate 61 is rotated in the retraction direction against the spring force of the spring 66. Before the cam plate 123 is moved to the storage position, the CCD image pickup unit 11 is retracted from the light path (two-dotted and dashed line in FIG. 4A). In this position, one corner of the CCD image pickup unit 11 enters a groove 123d formed in the cam plate 123 to prevent an interference with the cam plate 123.

When the zoom motor 116 rotates the cam ring 102 in the accommodation direction, the rear lens barrel 104 and the second lens group L2 are moved rearward, so that the second lens group L2 can be retracted in the vacant space of the light path in which the image pickup unit 11 was housed (see FIG. 2C).

If the zoom motor 116 is rotated in the lens advancing direction, the rear lens barrel and the rear lens group are moved forward, and the cam plate 123 is moved toward the wide-angle position or the telephoto position. Consequently, the projecting end 123c is moved in a direction away from the front end 64 of the leg portion 62, and hence the support plate 61 is rotated toward the photographable position by the spring force of the spring 66. Consequently, the CCD image pickup unit 11 is moved into the light path from which the second lens group L2 and the second lens barrel 104 have been retracted. Moreover, when the movement to the wide-angle position takes place, since the projecting end 123c is moved away from the front end 64, the support plate 61 is rotated by the spring force of the spring 65 until the support plate comes into contact with the positioning pin 67. Upon zooming, since the cam plate 123 is moved while the projecting end 123c is away from the front end 64, the CCD image pickup unit 11 is held in the photographable position in which the support plate 61 abuts against the positioning pin 67 due to the spring force of the spring 65.

In the embodiment illustrated in FIGS. 4A and 4B, if, for example, the power switch (not shown) is turned OFF, the zoom motor 106 is rotated in the lens accommodation direction to move the front lens barrel 103 and the rear lens barrel 104 rearward. At the same time, the cam plate 123 is slid in the lens accommodation direction, so that the support plate 61 is rotated in the retraction direction to retract the CCD image pickup unit 11 from the light path. Thereafter, the rear lens barrel 104 enters the portion of the light path from which the CCD image pickup unit 11 has been retracted. Therefore, the rear end of the rear lens barrel 104 or the second lens group L2 can be retracted in close proximity of the inner wall of the camera body.

As can be understood from the above discussion, according to the present invention, the light path between the third lens group L3 and the CCD image pickup element 17 is sealed by the cylindrical sealing member 21 and these elements are made integral. Therefore, no foreign matter such as dust sticks to the glass cover 15 of the CCD image pickup device 17 or the filter 13. Even if foreign matter does stick to the third lens group L3, since the position in which the foreign matter is located is away from the light receiving surface of the CCD image pickup device 17, the shadow of the foreign matter is dispersed and dimmed, thus resulting in less influence thereby.

Furthermore, according to the present invention, since the CCD image pickup unit including the third lens group is retracted from the photographing light path when the lens groups are moved rearward, so that a vacant space is formed behind the lens groups. Consequently, the lens groups can be moved in the vacant space. Accordingly, in case of a multiple lens group arrangement, since at least one lens group can be retracted from the light path, the camera body can be made thin.

What is claimed is:

1. A digital camera having an image pickup device which picks up an image formed by a photographing lens comprising:

a photographing lens comprising at least two lens groups of which the rearmost lens group does not move in the optical axis direction; and a sealing member which seals a light path defined between said rearmost lens group and said image pickup device.

2. A digital camera according to claim 1, wherein said photographing lens is a zoom lens and wherein said rearmost lens group does not move in the optical axis direction during the zooming operation or focusing operation of the zoom lens.

3. A digital camera according to claim 1, wherein said sealing member is made of a cylindrical member which forms an image pickup unit in which said rearmost lens group and said image pickup device are made integral with each other.

4. A digital camera according to claim 2, wherein said sealing member is made of a cylindrical member which forms an image pickup unit in which said rearmost lens group and said image pickup device are made integral with each other.

5. A digital camera according to claim 4, wherein said zoom lens is provided with a lens barrel which moves said first and second lens groups between a photographable position and a storage position, and a linkage which is adapted to move said image pickup unit into or out of the photographing light path through said support plate in association with the movement of said first and second lens groups.

6. A digital camera according to claim 4, wherein said zoom lens is a power zoom lens and is provided with a cam plate which is moved in a direction perpendicular to said optical axis of said power zoom lens in association with said zooming operation of said power zoom lens, and a linkage which moves said support plate in association with the movement of said cam plate when said power zoom lens is moved between said photographable position and said storage position and moves said image pickup unit into or out of the photographing light path.

7. A digital camera having an image pickup device which picks up an image formed by a photographing lens comprising:
- a photographing lens comprising at least two lens groups of which the rearmost lens group does not move in the optical axis direction;
- a cylindrical sealing member which forms an image pickup unit in which said rearmost lens group and said image pickup device are made integral with each other and which seals a light path defined between said rearmost lens group and said image pickup device; and
- an image pickup unit moving device which supports said image pickup unit to move into or out of the photographing light path.

8. A digital camera according to claim 7, wherein said photographing lens is a zoom lens and wherein said rearmost lens group does not move in the optical axis direction during the zooming operation or focusing operation of the zoom lens.

9. A digital camera according to claim 8, further comprising a lens driving device which moves the remaining lens group of said photographing lens into the portion of said photographing light path from which said image pickup unit has been retracted.

10. A digital still camera according to claim 9, wherein said photographing lens comprises first and second lens groups which are moved away from or close to each other along the optical axis, so that upon picking up an image, said first and second lens groups are moved forward and thereafter said image pickup unit moving device moves said image pickup unit into the photographing light path, and upon retraction, said image pickup unit moving device retracts said image pickup unit from the photographing light path and thereafter said second lens group is moved into said portion of said photographing light path from which said image pickup unit has been retracted.

11. A digital camera according to claim 10, wherein said image pickup unit is provided with a support plate which is pivoted on the camera body to rotate about a shaft which extends in parallel with the optical axis of the zoom lens, said image pickup unit being secured to said support plate so that said image pickup unit can be moved into or out of the photographing light path in accordance with the rotation of said support plate.

12. A digital camera according to claim 11, wherein said zoom lens is provided with a lens barrel which moves said first and second lens groups between a photographable position and a storage position, and a linkage which is adapted to move said image pickup unit into or out of the photographing light path through said support plate in association with the movement of said first and second lens groups.

13. A digital camera according to claim 11, wherein said zoom lens is a power zoom lens and is provided with a cam plate which is moved in a direction perpendicular to said optical axis of said power zoom lens in association with said zooming operation of said power zoom lens, and a linkage which moves said support plate in association with the movement of said cam plate when said power zoom lens is moved between said photographable position and said storage position and moves said image pickup unit into or out of the photographing light path.

* * * * *